United States Patent
Li (10) Patent No.: US 11,568,015 B2
(45) Date of Patent: Jan. 31, 2023

(54) CONTROL METHOD AND SYSTEM OF APPLET, SERVER AND TERMINAL DEVICE

(71) Applicant: Apollo Intelligent Connectivity (Beijing) Technology Co., Ltd., Beijing (CN)

(72) Inventor: Mingde Li, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/352,931

(22) Filed: Jun. 21, 2021

(65) Prior Publication Data
US 2021/0312006 A1 Oct. 7, 2021

(30) Foreign Application Priority Data
Nov. 17, 2020 (CN) .......................... 202011287887.9

(51) Int. Cl.
| | |
|---|---|
| G06F 17/00 | (2019.01) |
| G06F 16/955 | (2019.01) |
| G06F 40/205 | (2020.01) |
| G06F 40/30 | (2020.01) |
| G10L 15/26 | (2006.01) |

(52) U.S. Cl.
CPC ........ *G06F 16/9558* (2019.01); *G06F 40/205* (2020.01); *G06F 40/30* (2020.01); *G10L 15/26* (2013.01)

(58) Field of Classification Search
CPC .... G06F 16/9558; G06F 40/205; G06F 40/30; G06F 3/167; G06F 9/451; G06F 9/44505; G06F 9/44568; G10L 15/26
See application file for complete search history.

(56) References Cited

U.S. PATENT DOCUMENTS 6,157,705 A * 12/2000 Perrone ............... H04M 3/4938
707/E17.071
8,577,671 B1 * 11/2013 Barve ................. G06F 16/2457
715/752

(Continued)

FOREIGN PATENT DOCUMENTS

| | | | | |
|---|---|---|---|---|
| CN | 111586126 A | * | 8/2020 | ........... G02C 5/2245 |
| JP | H11-96099 A | | 4/1999 | |

(Continued)

OTHER PUBLICATIONS

European Search Report dated Dec. 8, 2021 for Application Serial No. EP21180997.5.

(Continued)

*Primary Examiner* — Laurie A Ries
(74) *Attorney, Agent, or Firm* — Tucker Ellis LLP (57) ABSTRACT

The present application discloses to a control method and system of an applet, a server, a terminal device, an electronic device, and a storage medium, which relate to artificial intelligence technology, voice technology, cloud technology, automatic driving technology, and information flow technology. The method includes: parsing audio information sent by a terminal device to obtain attribute information of the applet, where the audio information is used to instruct to open the applet; sending a request for acquiring page data to an applet server based on the attribute information; receiving the page data fed back by the applet server, generating a target page according to the page data and the attribute information, and sending the target page to the terminal device.

20 Claims, 7 Drawing Sheets

(56) References Cited

U.S. PATENT DOCUMENTS

| | | | |
|---|---|---|---|
| 10,346,498 B2* | 7/2019 | Hawkins | G06F 16/9558 |
| 2002/0007369 A1* | 1/2002 | Saravanan | G06F 16/957 |
| | | | 715/240 |
| 2004/0163087 A1* | 8/2004 | Sandland | G06F 9/451 |
| | | | 719/310 |
| 2005/0160065 A1* | 7/2005 | Seeman | G06F 16/957 |
| 2007/0226168 A1* | 9/2007 | Mukundan | G06F 9/547 |
| 2008/0250009 A1* | 10/2008 | Xie | G06F 16/951 |
| | | | 707/999.005 |
| 2016/0012820 A1 | 1/2016 | Mun et al. | |
| 2018/0039504 A1* | 2/2018 | Akuzawa | G06F 9/45529 |
| 2018/0191596 A1 | 7/2018 | Bhaya et al. | |
| 2018/0191777 A1* | 7/2018 | Volkov | H04L 63/1483 |
| 2020/0183928 A1* | 6/2020 | Wu | G06N 5/043 |
| 2021/0073307 A1* | 3/2021 | Lu | G06F 16/81 |

FOREIGN PATENT DOCUMENTS

| | | |
|---|---|---|
| JP | 2004-295722 A | 10/2004 |
| JP | 2013-97424 A | 5/2013 |
| JP | 2013-205524 A | 10/2013 |
| WO | 2020226616 A1 | 11/2020 |

OTHER PUBLICATIONS

Notice of Reasons for Refusal of corresponding Japanese Patent Application No. 2021-164402, dated Dec. 6, 2022, 14 pages.

* cited by examiner

CONTROL METHOD AND SYSTEM OF APPLET, SERVER AND TERMINAL DEVICE

CROSS-REFERENCE TO RELATED APPLICATIONS

This application claims priority to Chinese Patent Application No. 202011287887.9, filed on Nov. 17, 2020, which is hereby incorporated by reference in its entirety.

TECHNICAL FIELD

The present application relates to artificial intelligence technology, voice technology, cloud technology, automatic driving technology, and information flow technology in computer technology and data processing technology, and in particular to a control method and system of an applet, a server, a terminal device, an electronic device, and a storage medium.

BACKGROUND

With the rapid development of applet technology and terminal technology, applets are widely used in terminal devices to meet different requirements of users.

In prior art, it is generally necessary for the user to open the applet manually, and then the user may realize the interaction with the applet through voice or text.

However, the way to open the applet manually is relatively single and not convenient.

SUMMARY

The present application provides a control method and system of an applet, a server, a terminal device, an electronic device, and a storage medium for improving the flexibility of opening an applet.

According to a first aspect of the present application, a control method of an applet is provided, which is applied to a cloud server and includes:

parsing audio information sent by a terminal device to obtain attribute information of the applet, where the audio information is used to instruct to open the applet, and the attribute information is related to a frame and a page of the applet;

sending a request for acquiring page data to an applet server based on the attribute information; and receiving the page data fed back by the applet server, generating a target page according to the page data and the attribute information, and sending the target page to the terminal device.

In the embodiment, the control of the opening of the applet through voice is realized through the interaction between the cloud server and the terminal device, and the interaction between the cloud server and the applet server, thereby realizing the technical effect of flexibility and diversity of opening the applet, as well as improving the convenience of opening the applet.

According to a second aspect of the present application, a control method of an applet is provided, which is applied to a terminal device and includes:

receiving audio information input by a user, where the audio information is used to instruct to open the applet;

sending the audio information to a cloud server, where the audio information is used to obtain attribute information of the applet related to a frame and a page of the applet, and the attribute information is used to acquire page data corresponding to the applet, the page data is used to generate a target page corresponding to the applet; and receiving and outputting the target page.

According to a third aspect of the present application, a control method of an applet is provided, which is applied to an applet server and includes:

receiving a request sent by a cloud server for acquiring page data corresponding to the applet, where the request carries attribute information of the applet which is obtained by parsing audio information used to open the applet, and the attribute information is related to a frame and a page of the applet; and feeding back the page data determined according to the attribute information to the cloud server, where the page data is used to generate a target page corresponding to the applet according to the attribute information.

According to a fourth aspect of the present application, a cloud server is provided, including:

a first receiving module, configured to receive audio information sent by a terminal device, where the audio information is used to instruct to open the applet;

a parsing module, configured to parse the audio information to obtain attribute information of the applet, where the attribute information is related to a frame and a page of the applet;

a first sending module, configured to send a request for acquiring page data to an applet server based on the attribute information;

a second receiving module, configured to receive the page data fed back by the applet server;

a generating module, configured to generate a target page according to the page data and the attribute information; and a second sending module, configured to send the target page to the terminal device.

According to a fifth aspect of the present application, a terminal device is provided, including:

a third receiving module, configured to receive audio information input by a user, where the audio information is used to instruct to open an applet;

a third sending module, configured to send the audio information to a cloud server, where the audio information is used to obtain attribute information of the applet related to a frame and a page of the applet, and the attribute information is used to acquire page data corresponding to the applet, the page data is used to generate a target page corresponding to the applet;

a fourth receiving module, configured to receive the target page; and an outputting module, configured to output the target page.

According to a sixth aspect of the present application, an applet server is provided, including:

a fifth receiving module, configured to receive a request sent by a cloud server for acquiring page data corresponding to the applet, where the request carries attribute information of the applet which is obtained by parsing audio information used to open the applet, and the attribute information is related to a frame and a page of the applet;

a determining module, configured to determine the page data according to the attribute information, where the page data is used to generate a target page corresponding to the applet according to the attribute information; and a feedback module, configured to feed back the page data to the cloud server.

According to a seventh aspect of the present application, an electronic device is provided, including:

at least one processor; and a memory communicatively connected with the at least one processor; where, the memory stores instructions executable by the at least one processor, and the instructions are executed by the at least one processor, to cause the at least one processor to perform the method described in the first aspect; or to cause the at least one processor to perform the method described in the second aspect; or to cause the at least one processor to perform the method described in the third aspect.

According to an eighth aspect of the present application, a non-transitory computer-readable storage medium having stored thereon computer instructions is provided, the computer instructions are used to cause a computer to perform the method described in the first aspect; or the computer instructions are used to cause a computer to perform the method described in the second aspect; or the computer instructions are used to cause a computer to perform the method described in the third aspect.

According to a ninth aspect of the present application, a control system of applet is provided, including:

the cloud server as described in the fourth aspect;
the terminal device as described in the fifth aspect; and
the applet server as described in the sixth aspect.

According to the technical solution of the present application, audio information sent by a terminal device is parsed to obtain attribute information of the applet, where the audio information is used to instruct to open the applet, and the attribute information is related to a frame and a page of the applet; a request for acquiring page data is sent to an applet server based on the attribute information; the page data fed back by the applet server is received, a target page is generated according to the page data and the attribute information, and the target page is sent to the terminal device, so as to output the target page by the terminal device, thus avoiding the problem of single control mode and low flexibility caused by manually opening the applet in related art, realizing the technical effect of diversity and flexibility of controlling the opening of the applet, and improving the convenience of controlling the opening of the applet. Especially for in-vehicle scenarios, hands of a driver may be released, thereby achieving the technical effect of improving driving safety and reliability.

It should be understood that the content described in this section is not intended to identify key or important features of the embodiments of the present application, nor is it intended to limit the scope of the present application. Other features of the present application will be easily understood through the following description.

BRIEF DESCRIPTION OF DRAWINGS

The accompanying drawings are used to better understand solutions, and do not limit the present application. In the accompanying drawings.

DESCRIPTION OF EMBODIMENTS

The following describes exemplary embodiments of the present application in combination with the accompanying drawings, in which various details of the embodiments of the present application are included to facilitate understanding, and they shall be considered as merely exemplary. Therefore, those skilled in the art should realize that various changes and modifications can be made to the embodiments described herein without departing from the scope and spirit of the present application. Similarly, for the sake of clarity and conciseness, the description of well-known functions and structures is omitted in the following.

Figure 1:
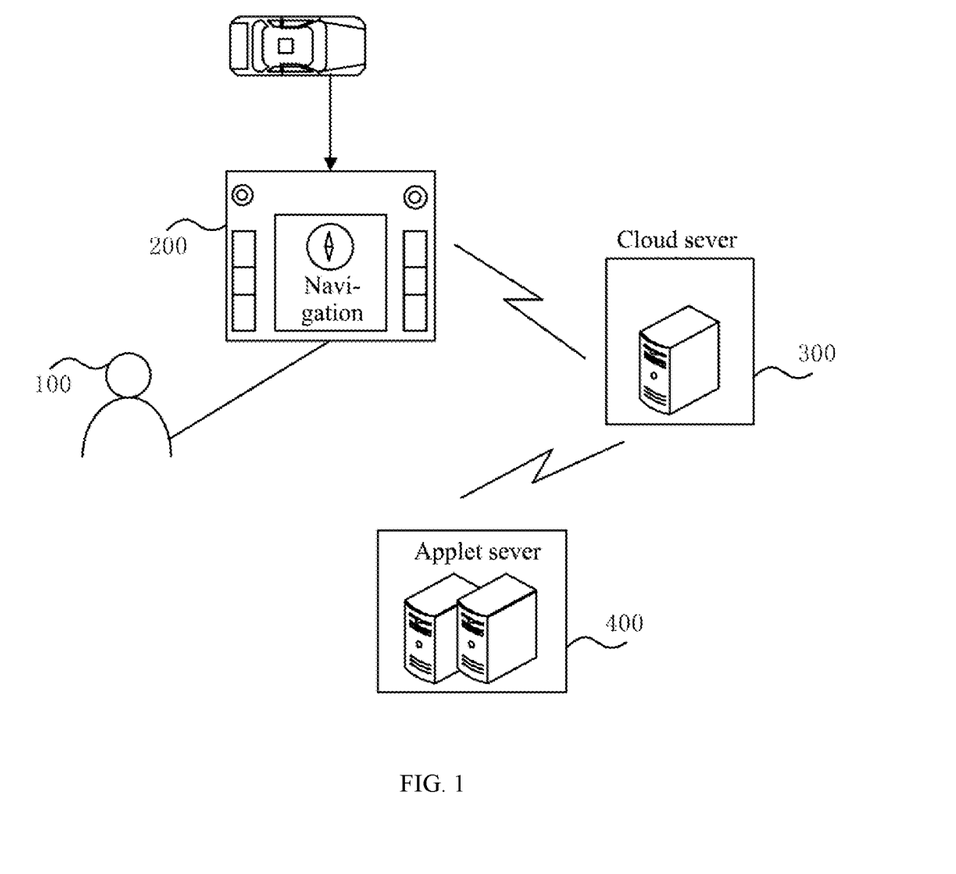
FIG. 1 is a schematic diagram according to a first embodiment of the present application.

FIG. 1 is a schematic diagram according to a first embodiment of the present application. As shown in FIG. 1, the application scenario of the control method of the applet in the embodiment includes: a user 100, a terminal device 200 (a vehicle-mounted terminal installed on a vehicle is shown as an example in FIG. 1), a cloud server 300, and an applet server 400.

Exemplarily, the terminal device 200 is used to represent an electronic device that can run an applet, input audio information, and output a page.

For example, the terminal device may be a mobile terminal, such as a mobile phone (or called "cellular" phone) and a computer with a mobile terminal. For example, it may be a portable, pocket-sized, handhold, built-in computer or vehicle-mounted mobile device, which exchange language and/or data with a wireless access network; the terminal device may also be a personal communication service (PCS) phone, a cordless phone, a session initiation protocol (SIP) phone, a wireless local loop (WLL) station, a personal digital assistant (PDA), a tablet, a wireless modem, a handset, a laptop computer, a machine type communication (MTC) terminal and so on; the terminal device may also be called as a system, a subscriber unit, a subscriber station, a mobile station, a mobile, a remote station, a remote terminal, an access terminal, a user terminal, a user agent, a user device or a user equipment, etc., which is not limited herein.

Exemplarily, the cloud server 300 may be used to represent a server set on a cloud platform, and the cloud server may include an independently set server (as shown in FIG. 1), and may also include a server cluster.

In the same way, the applet server 400 is used to represent a server corresponding to the applet run by the terminal device, and the applet server may also include an independently set server, and may also include a server cluster as shown in FIG. 1.

In the application scenario shown in FIG. 1, when the user 100 needs to use an applet, for example, when the user needs to buy a movie ticket by using an applet for purchasing movie tickets, the user 100 may input audio information to the terminal device 200 through voice, where the audio information may be used to instruct to open the applet for purchasing movie tickets.

Accordingly, the terminal device 200 may receive the audio information input by the user 100. For example, the terminal device 200 may include an audio information collection component, such as a microphone, and the terminal device 200 may collect the audio information input by the user 100 through the microphone.

The terminal device 200 may send the audio information to the cloud server 300.

Accordingly, the cloud server 300 may receive the audio information, and parse the audio information to determine that the applet which the user 100 needs to use is the applet for purchasing movie tickets.

The cloud server 300 may interact with the applet server 400. For example, when the cloud server 300 determines, based on the audio information, that the applet which the user needs to use is an applet for purchasing movie tickets, and may acquire from the applet server 400 page data related to the applet for purchasing movie tickets, and generate a page corresponding to the applet for purchasing movie tickets based on the page data, and send the page to the terminal device 200.

Accordingly, the terminal device 200 may receive the page sent by the cloud server 300 and display the page, so that the user 100 may use the applet to fulfill the demand of purchasing movie tickets.

It should be understood that the above application scenarios are only used for exemplification, which are the application scenarios applicable for the control method of the applet in the embodiment, and cannot be understood as a limitation on the application scenarios of the embodiment. And the applet in the above example is only used for exemplification, which may be applicable in a specific application, and cannot be understood as a limitation on the type of the applet.

In related art, a user inputs a touch screen instruction to the terminal device by touching a screen. The touch screen instruction is used to instruct to open an applet corresponding to a position on the screen where the user touches. Accordingly, the terminal device receives the touch screen instruction, obtains and outputs a page corresponding to the applet from the applet server according to the touch screen instruction.

However, with solutions in the related art, the user needs to manually open the applet, thus lacking intelligence. Especially when the terminal device is a vehicle-mounted terminal, that is, when the user needs to open the applet in a driving scenario, it is likely to cause vehicle accidents. Therefore, how to release hands of a user and improve the intelligence of the control of applets have become the problem to be solved.

The inventor of the present application has obtained the inventive concept of the present application through creative work: a terminal device receives audio information input by a user and used to instruct to open an applet; and through the interaction between the terminal device and a cloud server, and the interaction between the cloud server and an applet server, a page corresponding to the applet can be output on the terminal device based on the audio information, thereby realizing the intelligent effect of the control of the applet.

The technical solutions of the present application and how the technical solutions of the present application solve the above technical problem will be described in detail below with specific embodiments. The following specific embodiments can be combined with each other, and the same or similar concepts or processes may not be repeated in some embodiments. The embodiments of the present application will be described below in combine with the accompanying drawings.

The present application provides a control method of an applet, which is applied to artificial intelligence, automatic driving, voice technology in the computer field and the cloud technology field, so as to achieve the effect of intelligently controlling the applet through voice.

Figure 2:
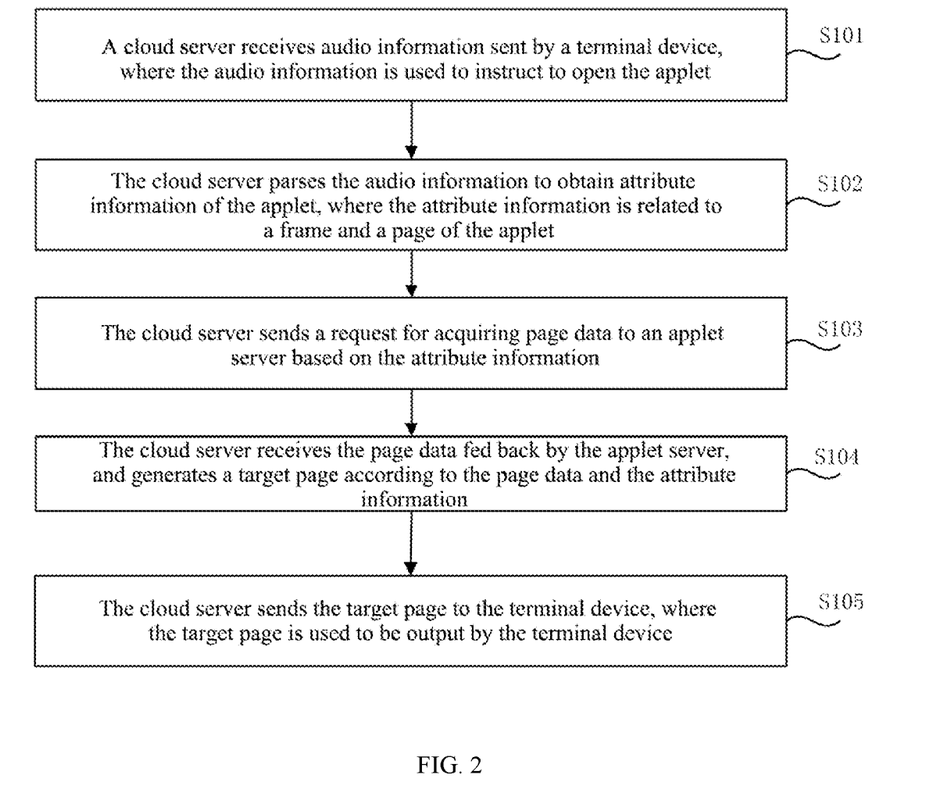
FIG. 2 is a schematic diagram according to a second embodiment of the present application.

FIG. 2 is a schematic diagram according to a second embodiment of the present application. As shown in FIG. 2, a control method of an applet provided in the embodiment includes:

S101: a cloud server receives audio information sent by a terminal device, where the audio information is used to instruct to open the applet.

Exemplarily, the applet may be used to represent an application which can be directly used based on the terminal device without downloading by the terminal device. In other words, the applet is an application that may be run on the terminal device and does not need to be downloaded.

In an example, the terminal device may run an application (APP) in its background, and the audio information received by the cloud server is audio information sent by the application running in the background of the terminal device.

In another example, the terminal device may run an application in its foreground, and the audio information received by the cloud server is audio information sent by the application running in the foreground of the terminal device.

Where the terms "foreground" and "background" in the embodiment are relative concepts. The application running in the foreground may be understood as an application being in an open state, not closed, but not operated by the user either, however, the application also occupies the running memory of the terminal device. The application running in the background may continue to be used when opened, there is no need to reopen, rerun, or re-login, since the application is always in a running state but not operated by the user. Accordingly, an application program running in the foreground may be understood as the application program being in the open state and being operated by the user currently.

The audio information may be used to represent voice-related information, and in the embodiment, the audio information may be specifically used to represent the information related to voice for instructing to open the applet on the terminal device. For example, the audio information may be audio information including a name of the applet, such as "Open XX applet (name of the applet)", and the audio information may also be audio information including a use of the applet, "Purchase two XX movie tickets (i.e. an applet that supports movie ticket services)", etc.

S102: the cloud server parses the audio information to obtain attribute information of the applet, where the attribute information is related to a frame and a page of the applet.

Exemplarily, the cloud server may be set to include a natural language processing (NLP) function component, in order to parse the audio information based on the NLP function component to obtain the attribute information. Moreover, the attribute information may be understood from two dimensions (perspectives), one dimension is information related to the frame of the applet, and the other dimension is information related to the page of the applet.

S103: the cloud server sends a request for acquiring page data to an applet server based on the attribute information.

Exemplarily, the cloud server may generate a request including the attribute information, and send the request to the applet server, where the request is used to acquire the page data corresponding to the applet.

S104: the cloud server receives the page data fed back by the applet server, and generates a target page according to the page data and the attribute information.

It is worth noting that after the cloud server sends a request for acquiring page data to the applet server, the applet server may respond to the request of the cloud server, such as feedback the page data, and the cloud server may generate the target page corresponding to the audio information based on the page data and the attribute information.

For example, taking the applet for purchasing movie tickets in the above embodiment as an example, after the cloud server sends a request for acquiring the page data of the applet for purchasing movie tickets to the applet server, the applet server may respond to the request of the cloud server, i.e. feedback the page data of the applet for purchasing movie tickets, and the cloud server may generate the page (i.e. the target page) of the applet corresponding to "Buy two XX movie tickets" based on the attribute information and the page data of the applet for purchasing movie tickets.

S105: the cloud server sends the target page to the terminal device, where the target page is used to be output by the terminal device.

It is worth noting that in the embodiment, through the interaction among the terminal device, the cloud server and the applet server, the target page corresponding to the applet can be generated through voice and the output of the target page can be realized. In this way, the opening of the applet through voice is realized, thus realizing the intelligence and flexibility of opening the applet. Especially in driving scenarios, safety risks of vehicle driving caused by manual opening of the applet by the user in the related art are avoided, thus achieving the technical effect of releasing manpower and improving the safety and reliability of vehicle driving.

Figure 3:
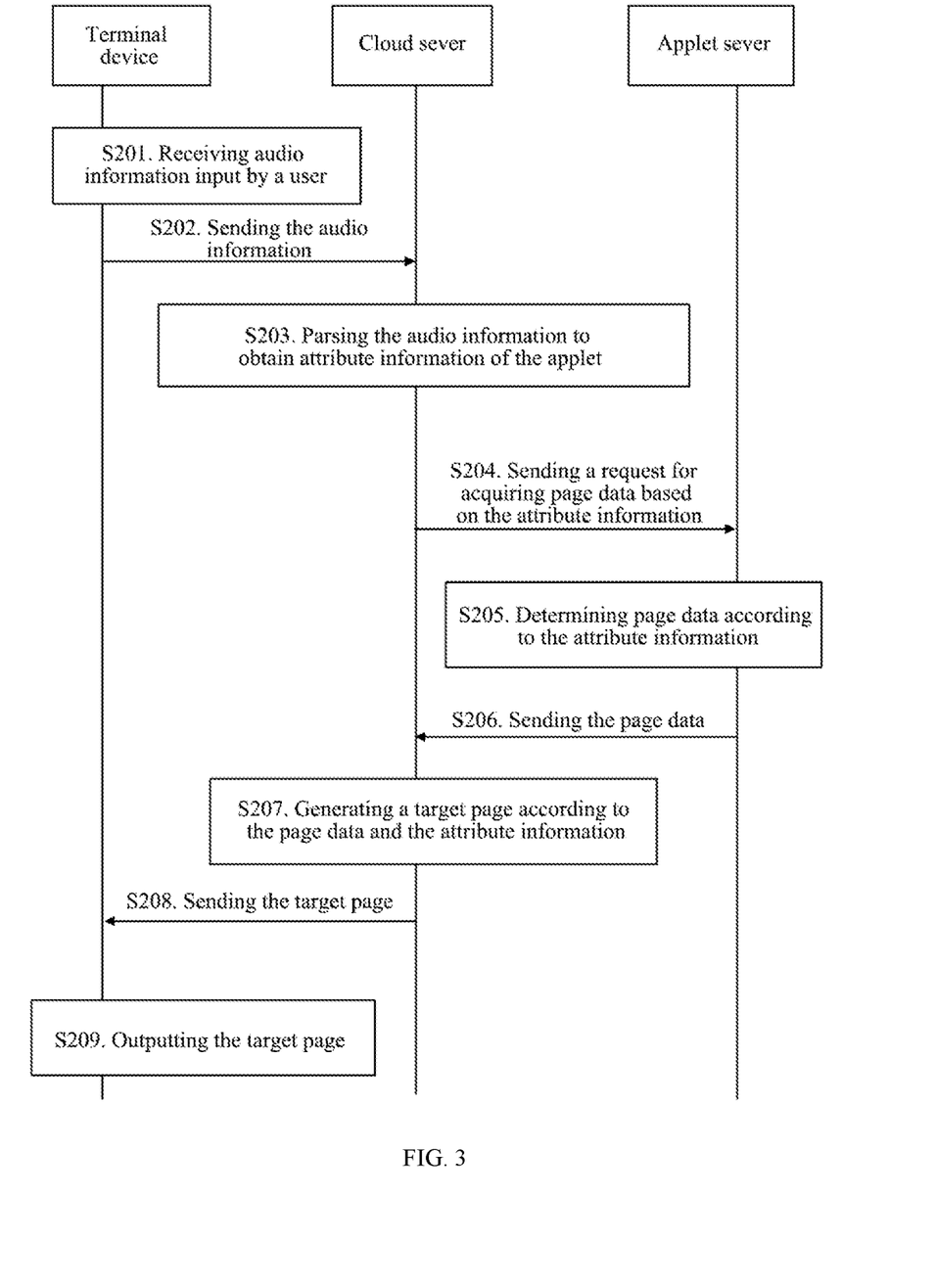
FIG. 3 is a schematic diagram according to a third embodiment of the present application.

FIG. 3 is a schematic diagram according to a third embodiment of the present application. As shown in FIG. 3, a control method of an applet provided in the embodiment includes:

S201: a terminal device receives audio information input by a user, where the audio information is used to instruct to open the applet.

With reference to the example above, the terminal device may include an audio information collection component, such as a microphone, and the terminal device may collect the audio information input by the user through the microphone.

S202: the terminal device sends the audio information to a cloud server.

Accordingly, the cloud server receives the audio information sent by the terminal device.

S203: the cloud server parses the audio information to obtain attribute information of the applet, where the attribute information is related to a frame and a page of the applet.

In some embodiments, S203 may include the following steps.

Step 1: converting the audio information into text information.

In combination with the above example, the cloud server may be set to include an NLP function component in order to convert the audio information into the text information based on the NLP function component.

Step 2: performing semantic parsing on the text information to obtain the intent for determining the frame and the intent for determining the page corresponding to the applet, and the slot information for determining a slot corresponding to the intent of the page.

Exemplarily, the NLP function component can perform operations such as syntax analysis, semantic representation, semantic relationship, lexical analysis, and semantic parsing on the text information, so as to obtain the attribute information corresponding to the text information.

For example, if the text information is "Buy two XX movie tickets on the XX applet", the cloud server parses the text information based on the NLP function, and determines the intent of the frame as the frame of the XX applet, and the intent of the page as the page of purchasing movie tickets, and the slot information as two tickets and XX movie.

S204: the cloud server sends a request for acquiring page data to the applet server based on the attribute information.

Accordingly, the applet server receives a request sent by the cloud server for acquiring the page data corresponding to the applet, and the request carries the attribute information of the applet.

S205: the applet server determines the page data according to the attribute information, where the page data is used to generate a target page corresponding to the applet according to the attribute information.

In some embodiments, the attribute information sent by the cloud server to the applet server includes attribute information related to the frame of the applet, and may also include attribute information related to the page of the applet. Then the cloud server may determine all the page data of the applet based on the attribute information related to the frame of the applet and select, according to the attribute information related to the page of the applet, page data corresponding to the attribute information related to the page of the applet (that is, the page data determined in S205 and used to generate the target page) from all the page data of the applet.

For example, in combination with the above example, if the attribute information includes the intent of the frame (for example, the intent of the frame is the frame of the XX applet), the intent of the page (for example, the intent of the page is the page for purchasing movie tickets) and the slot information (for example, the slot information is two tickets and XX movie), the applet server can determine all the page data of the XX applet according to the intent of the frame, and select the page data corresponding to the page for purchasing movie tickets from all the page data of the XX applet according to the intent of the page for purchasing movie tickets, and select the page date corresponding to two XX movie tickets (that is, the page data determined in S205 and used to generate the target page) from the page data corresponding to the page for purchasing movie tickets.

In other embodiments, the attribute information sent by the cloud server to the applet server includes attribute information related to the page of the applet, such as the intent of the page and slot information, and the cloud server can determine all the page data related to the intent of the page based on the intent of the page and select the page data corresponding to the slot information (that is, the page data determined in S205 and used to generate the target page) from all the page data related to the intent of the page.

For example, in combination with the above example, if the intent of the page (for example, the intent of the page is the page for buying movie tickets) and the slot information (for example, the slot information is two tickets and XX movie), the applet server may select the page data corresponding to the page for purchasing movie tickets from all the page data according to the intent of the page for purchasing movie tickets, and select the page date corresponding to two XX movie tickets (that is, the page data determined in S205 and used to generate the target page) from the page data corresponding to the page for purchasing movie tickets.

S206: the applet server sends the page data to the cloud server.

Accordingly, the cloud server receives the page data sent by the applet server.

S207: the cloud server generates a target page according to the page data and the attribute information.

In some embodiments, the intent of the frame includes a uniform resource locator (URL), and S207 may include the following steps.

Step 1: determining location information of the page frame stored in the cloud server according to the uniform resource locator.

Exemplarily, the cloud server can interact with a respective server corresponding to each applet in advance, and establish a subscription relationship. The subscription relationship can be used to represent that the cloud server may deploy each applet, such as storing the frame of each applet, and generate pages corresponding to each applet, etc.

In some embodiments, the cloud server may store the page frame of the applet with the subscription relationship established, and establish the mapping relationship between the respective uniform resource locator corresponding to each applet and the storage location. Accordingly, when the cloud server parses the audio information to obtain the attribute information, the location information may be determined from the constructed mapping relationship based on the uniform resource locator in the attribute information. And the mapping relationship can be implemented through Key-Value storage.

It is worth noting that when the cloud server interacts with the respective server corresponding to each applet and establishes subscription relationship, in an example, the servers of the applets can implement the deployment of the applets based on the preset intent of setting the page and way of setting the slot, so as to implement the deployment of the applets by the cloud server; in another example, the server corresponding to each applet can set respective intents corresponding to different pages (which can be called vertical intents) and slots corresponding to respective intents. Correspondingly, the cloud server can deploy the applets based on the respective intents of the applets and the characteristics of the slots, so as to achieve the technical effect of flexibly deploying the intent of the page and the slot.

Step 2: calling the page frame from the cloud server according to the location information.

Based on the above example, if the cloud server has determined the location information based on the uniform resource locator, it can call the page frame corresponding to the applet stored at a location indicated by location information.

It is worth noting that in the embodiment, by determining the location information of the page frame of the applet stored in the cloud server based on the uniform resource locator, and calling the page frame based on the location information, the technical effect of flexibility and accuracy for calling the page frame can thus be achieved.

Step 3: filling the page data into the page frame to generate the target page.

Exemplarily, when the cloud server calls the page frame and receives the page data sent by the applet server, the page frame can be adjusted based on the page data, and operations such as rendering can be performed, so as to generate the target page.

It is worth noting that in the embodiment, by determining the page frame and the page data respectively, and filling the page frame with the page data, the target page (i.e. the page corresponding to the applet) can be obtained, thus realizing the opening of the applet through voice, as well as achieving the technical effect of flexibility and diversity for opening the applet.

S208: the cloud server sends the target page to the terminal device.

Accordingly, the terminal device receives the target page sent by the cloud server.

S209: the terminal device outputs the target page.

Exemplarily, the terminal device includes a display, and if the terminal device receives the target page sent by the cloud server, it can control the display to display the target page.

Where the display can be used to represent an apparatus that displays a video, such as a liquid crystal display (LCD), a light emitting diode (LED) display, and an organic light emitting display (OLED), etc., which is not limited in the embodiment of the present application.

Figure 4:
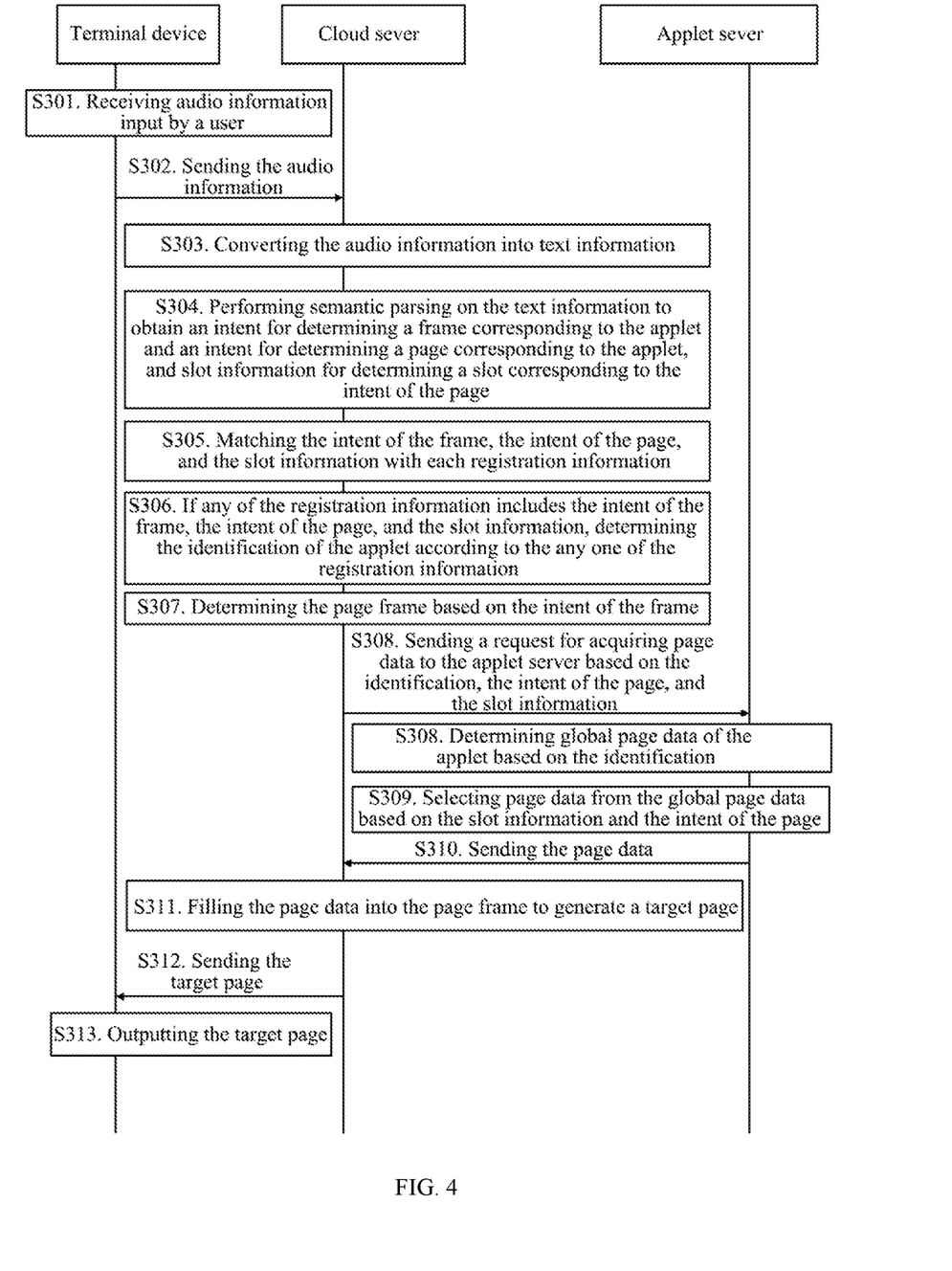
FIG. 4 is a schematic diagram according to a fourth embodiment of the present application.

FIG. 4 is a schematic diagram according to a fourth embodiment of the present application. As shown in FIG. 4, a control method of an applet provided in the embodiment includes:

S301: a terminal device receives audio information input by a user, where the audio information is used to instruct to open the applet.

Exemplarily, the description of S301 may refer to S201, which will not be repeated this time.

S302: the terminal device sends the audio information to a cloud server.

Accordingly, the cloud server receives the audio information sent by the terminal device.

S303: the cloud server converts the audio information into text information.

S304: the cloud server performs semantic parsing on the text information to obtain an intent for determining the frame corresponding to the applet and an intent for determining the page corresponding to the applet, and slot information for determining a slot corresponding to the intent of the page.

Exemplarily, the description of S303 and S304 may refer to S203 in the third embodiment, which will not be repeated this time.

S305: the cloud server matches the intent of the frame, the intent of the page, and the slot information with each registration information, where the cloud server stores the registration information generated when at least one applet is registered in the cloud server.

Compared with the third embodiment, the cloud server of the embodiment stores registration information, and the registration information may be a piece of registration information generated when an applet is registered on the cloud server, or may also be the respective corresponding registration information generated when multiple applets are registered on the cloud server.

S306: if any of the registration information includes the intent of the frame, the intent of the page, and the slot information, the cloud server determines the identification of the applet according to the any one of the registration information, where the attribute information includes the identification.

Exemplarily, if each of registration information includes a corresponding intent of the frame, a corresponding intent of the page, and corresponding slot information, the cloud server may compare the intent of the frame, the intent of the page, and the slot information in the attribute information with the intent of the frame, the intent of the page and the slot information in each of the registration information respectively. If a certain piece of registration information among the multiple pieces of registration information includes the intent of the frame, the intent of the page and the slot information in the attribute information, the cloud server determines the identification according to this piece of registration information.

It is worth noting that in the embodiment, any applet can be registered in the cloud server and its corresponding registration information is generated, and the identification can be determined by virtue of the registration information. In this way, fast and reliable acquisition for page data of the applet thereafter can be realized, so as to achieve the technical effect of high efficiency, reliability and accuracy for controlling the opening of the applet through voice.

In some embodiments, S306 may include the following steps.

Step 1: determining information of a server corresponding to the applet according to any one of the registration information.

Exemplarily, since the applet is registered in the cloud server and the registration information is generated, the cloud server may determine relevant information of the applet based on the registration information, such as the information of the server of the applet.

Step 2: acquiring the identification from the server corresponding to the applet according to the information of the server corresponding to the applet.

Exemplarily, after determining the information of the server corresponding to the applet, the cloud server may send a request for acquiring the identification of the applet to the server corresponding to the applet, and accordingly, the server corresponding to the applet may feedback the identification to the cloud server.

It is worth noting that in the embodiment, by determining the information of the server corresponding to the applet according to any one of the registration information, the information of the server corresponding to the applet can be accurately located, and by determining the identification from the server corresponding to the applet according to the information of the server corresponding to the applet, the technical effect of determining an accurate and reliable identification can be achieved, thereby achieving the technical effect of accurately searching page data based on the identification.

S307: the cloud server determines the page frame based on the intent of the frame.

Exemplarily, the description of S307 may refer to step 1 and step 2 of S207 in the third embodiment, which will not be repeated here.

S308: the cloud server sends a request for acquiring page data to the applet server based on the identification, the intent of the page, and the slot information.

Accordingly, the applet server receives the request for acquiring the page data.

S308: the applet server determines global page data of the applet based on the identification.

In the embodiment, since the applet server acquires the identification, the applet server can thus determine the global page data based on the identification quickly and conveniently.

S309: the applet server selects page data from the global page data based on the slot information and the intent of the page.

Exemplarily, S309 may include: the applet server may select partial page data corresponding to the intent of the page from the global page data, and select page data from the partial page data based on the slot information.

It is worth noting that in the embodiment, the cloud server determines the identification based on the registration information, and the applet server determines the page data based on the slot information and the intent of the page. On one hand, all page data can be determined efficiently and accurately based on the identification, so as to achieve the technical effect of improving the efficiency and reliability for controlling the opening of the applet through voice; on the other hand, in combination with the third embodiment, as can be seen in the third embodiment, the page data is determined vaguely based on the intent of the frame, but in this embodiment, the page data is determined accurately based on the identification.

S310: the applet server sends the page data to the cloud server.

Accordingly, the cloud server receives the page data sent by the applet server.

S311: the cloud server fills the page data into the page frame to generate a target page.

Exemplarily, the description of S311 may refer to step 3 of S207 in the third embodiment, which will not be repeated here.

S312: the cloud server sends the target page to the terminal device.

Accordingly, the terminal device receives the target page sent by the cloud server.

S313: the terminal device outputs the target page.

Exemplarily, the description of S311 may refer to S209 in the third embodiment, which will not be repeated here.

Figure 5:
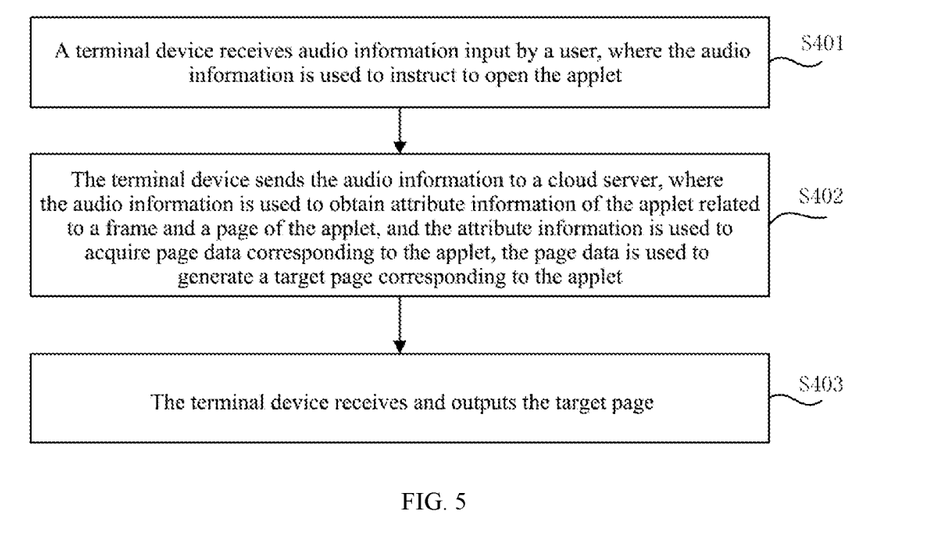
FIG. 5 is a schematic diagram according to a fifth embodiment of the present application.

FIG. 5 is a schematic diagram according to a fifth embodiment of the present application. As shown in FIG. 5, a control method of an applet provided in the embodiment includes:

S401: a terminal device receives audio information input by a user, where the audio information is used to instruct to open the applet; S402: the terminal device sends the audio information to a cloud server, where the audio information is used to obtain attribute information of the applet related to a frame and a page of the applet, and the attribute information is used to acquire page data corresponding to the applet, the page data is used to generate a target page corresponding to the applet; and S403: the terminal device receives and outputs the target page.

In some embodiments, the target page is generated by filling a page frame with the page data, and the page frame is determined based on the attribute information related to the frame of the applet.

In some embodiments, the attribute information is obtained by converting the audio information into text information on which semantic parsing is performed, and the attribute information includes: an intent for determining a frame and an intent for determining a page corresponding to the applet, and slot information corresponding to the intent of the page.

In some embodiments, the intent of the frame includes a uniform resource locator, and the page frame is called according to location information of the page frame stored in the cloud server, and the location information is determined based on the uniform resource locator.

In some embodiments, the attribute information further includes an identification of the applet, and the identification of the applet is determined based on matching of the intent of the frame, the intent of the page, and the slot information with each registration information, and the registration information includes registration information generated when at least one applet is registered in the cloud server.

In some embodiments, the identification is acquired from a server corresponding to the applet according to information of the server corresponding to the applet, and the information of the server corresponding to the applet is determined based on any one of the registration information.

In some embodiments, the page data is selected from global page data of the applet according to the slot information and the intent of the page, and the global page data is determined based on the identification.

Figure 6:
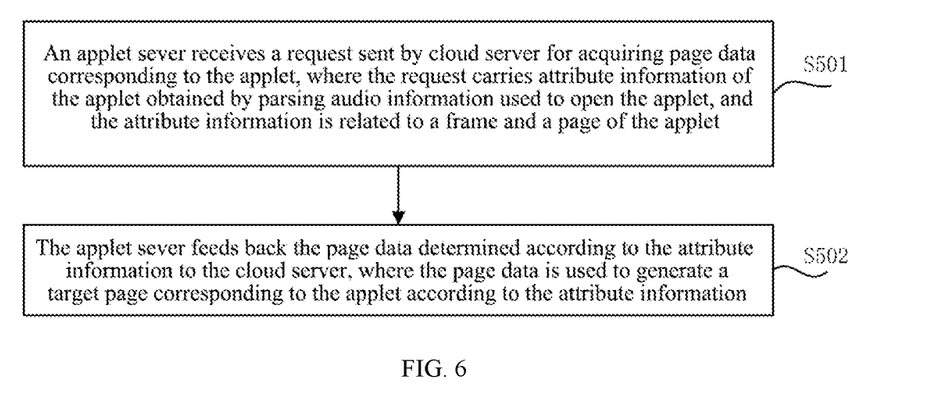
FIG. 6 is a schematic diagram according to a sixth embodiment of the present application.

FIG. 6 is a schematic diagram according to a sixth embodiment of the present application. As shown in FIG. 6, a control method of an applet provided in the embodiment includes:

S501: an applet sever receives a request sent by a cloud server for acquiring page data corresponding to the applet, where the request carries attribute information of the applet obtained by parsing audio information used to open the applet, and the attribute information is related to a frame and a page of the applet; and S502: the applet sever feeds back the page data determined according to the attribute information to the cloud server, where the page data is used to generate a target page corresponding to the applet according to the attribute information.

Figure 7:
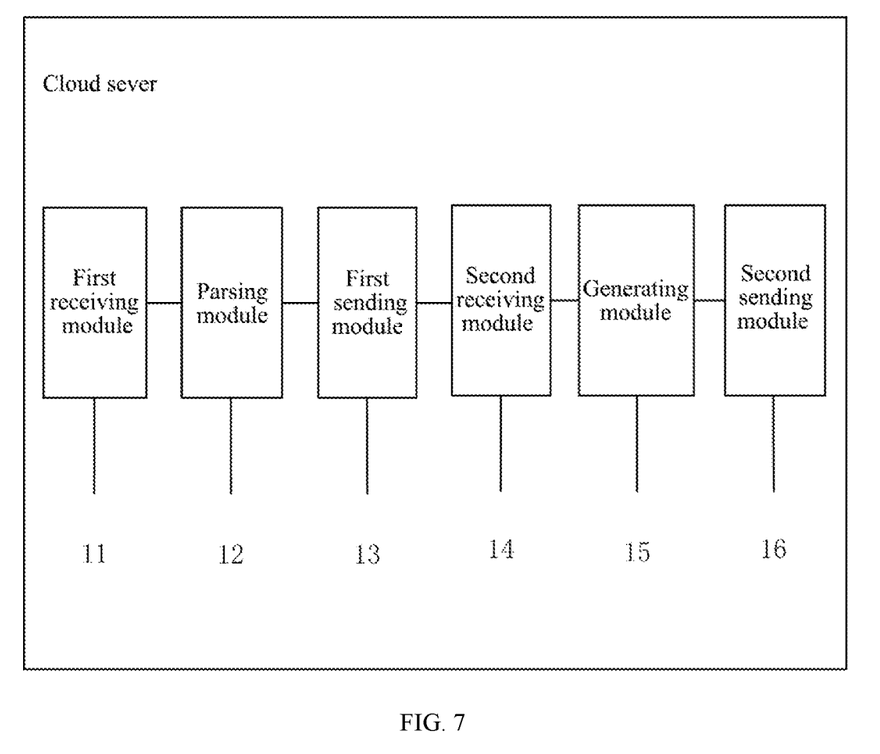
FIG. 7 is a schematic diagram according to a seventh embodiment of the present application.

FIG. 7 is a schematic diagram according to a seventh embodiment of the present application. As shown in FIG. 7, the cloud server provided in the embodiment includes:

a first receiving module 11, configured to receive audio information sent by a terminal device, where the audio information is used to instruct to open the applet;

a parsing module 12, configured to parse the audio information to obtain attribute information of the applet, where the attribute information is related to a frame and a page of the applet;

a first sending module 13, configured to send a request for acquiring page data to applet server based on the attribute information;

a second receiving module 14, configured to receive the page data fed back by the applet server;

a generating module 15, configured to generate a target page according to the page data and the attribute information; and a second sending module 16, configured to send the target page to the terminal device.

In some embodiments, the generating module 15 is configured to determine a pre-stored page frame of the applet according to the attribute information related to the frame of the applet, and fill the page data into the page frame to generate the target page.

In some embodiments, the attribute information includes an intent of a frame, an intent of a page, and slot information; the parsing module 12 is configured to convert the audio information into text information, and perform semantic parsing on the text information to obtain the intent for determining the frame and the intent for determining the page corresponding to the applet, and the slot information for determining a slot corresponding to the intent of the page.

In some embodiments, the intent of the frame includes a uniform resource locator; the parsing module 12 is configured to determine location information of the page frame stored in the cloud server according to the uniform resource locator, and call the page frame from the cloud server according to the location information.

In some embodiments, the cloud server stores registration information generated when at least one applet is registered in the cloud server, and the attribute information further includes an identification of the applet; the parsing module 12 is configured to match the intent of the frame, the intent of the page, and the slot information with each registration information and determine the identification according to any one of the registration information, if the any one of the registration information includes the intent of the frame, the intent of the page, and the slot information.

In some embodiments, the parsing module 12 is configured to determine information of a server corresponding to the applet according to the any one of the registration information; and acquire the identification from the server corresponding to the applet according to the information of the server corresponding to the applet.

In some embodiments, the page data is selected from global page data of the applet according to the slot information and the intent of the page, and the global page data is determined based on the identification.

Figure 8:
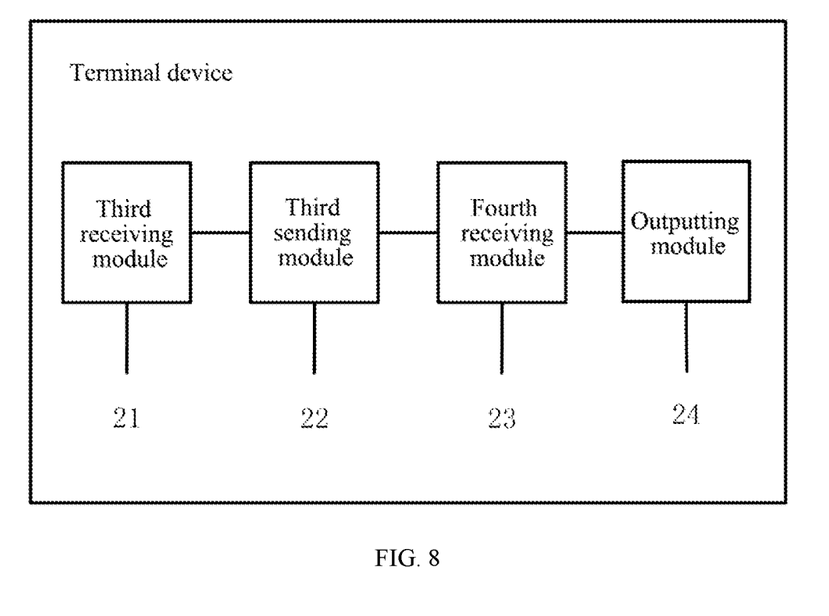
FIG. 8 is a schematic diagram according to an eighth embodiment of the present application.

FIG. 8 is a schematic diagram according to an eighth embodiment of the present application. As shown in FIG. 8, the terminal device provided in the embodiment includes:

a third receiving module 21, configured to receive audio information input by the user, where the audio information is used to instruct to open an applet;

a third sending module 22, configured to send the audio information to a cloud server, where the audio information is used to obtain attribute information of the applet related to a frame and a page of the applet, and the attribute information is used to acquire page data corresponding to the applet which is used to generate a target page corresponding to the applet;

a fourth receiving module 23, configured to receive the target page; and an outputting module 24, configured to output the target page.

In some embodiments, the target page is generated by filling a page frame with the page data, and the page frame is determined based on the attribute information related to the frame of the applet.

In some embodiments, the attribute information is obtained by converting the audio information into text information on which semantic parsing is performed, and the attribute information includes: an intent for determining a frame and an intent for determining a page corresponding to the applet, and slot information corresponding to the intent of the page.

In some embodiments, the intent of the frame includes a uniform resource locator, and the page frame is called according to location information of the page frame stored in the cloud server, and the location information is determined based on the uniform resource locator.

In some embodiments, the attribute information further includes an identification of the applet, and the identification of the applet is determined based on matching of the intent of the frame, the intent of the page, and the slot information with each registration information, and the registration information includes registration information generated when at least one applet is registered in the cloud server.

In some embodiments, the identification is acquired from a server corresponding to the applet according to information of the server corresponding to the applet, and the information of the server corresponding to the applet is determined based on the registration information.

In some embodiments, the page data is selected from global page data of the applet according to the slot information and the intent of the page, and the global page data is determined based on the identification.

Figure 9:
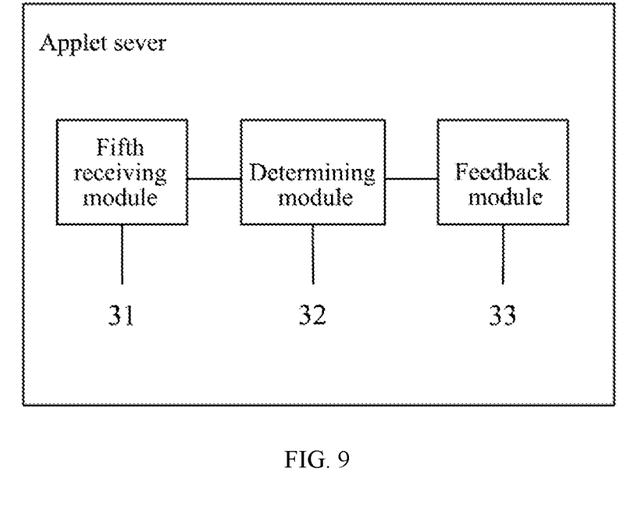
FIG. 9 is a schematic diagram according to a ninth embodiment of the present application.

FIG. 9 is a schematic diagram according to a ninth embodiment of the present application. As shown in FIG. 9, the applet server provided in the embodiment includes:

a fifth receiving module 31, configured to receive a request sent by a cloud server for acquiring page data corresponding to the applet, where the request carries attribute information of the applet which is obtained by parsing audio information used to open the applet, and the attribute information is related to a frame and a page of the applet;

a determining module 32, configured to determine the page data according to the attribute information, where the page data is used to generate a target page corresponding to the applet according to the attribute information; and a feedback module 33, configured to feed back the page data to the cloud server.

In some embodiments, the target page is generated by filling a page frame with the page data, and the page frame is determined based on the attribute information related to the frame of the applet.

In some embodiments, the attribute information is obtained by converting the audio information into text information on which semantic parsing is performed, and the attribute information includes: an intent for determining a frame and an intent for determining a page corresponding to the applet, and slot information corresponding to the intent of the page.

In some embodiments, the intent of the frame includes a uniform resource locator, and the page frame is called according to location information of the page frame stored in the cloud server, and the location information is determined based on the uniform resource locator.

In some embodiments, the attribute information further includes an identification of the applet, and the identification of the applet is determined based on matching of the intent of the frame, the intent of the page, and the slot information with each registration information, and the registration information includes registration information generated when at least one applet is registered in the cloud server.

In some embodiments, the identification is acquired from a server corresponding to the applet according to information of the server corresponding to the applet, and the information of the server corresponding to the applet is determined based on the registration information.

In some embodiments, the determining module 32 is configured to determine global page data of the applet according to the identification and select the page data from the global page data according to the slot information and the intent of the page.

According to an embodiment of the present application, a control system of applet is further provided, the system including:

the cloud server described in any of the above embodiments, as shown in FIG. 7;

the terminal device described in any of the above embodiments, as shown in FIG. 8; and the applet server described in any of the above embodiments, as shown in FIG. 9.

According to an embodiment of the present application, an electronic device and a readable storage medium are further provided.

Exemplarily, the electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present application described and/or claimed herein.

Figure 10:
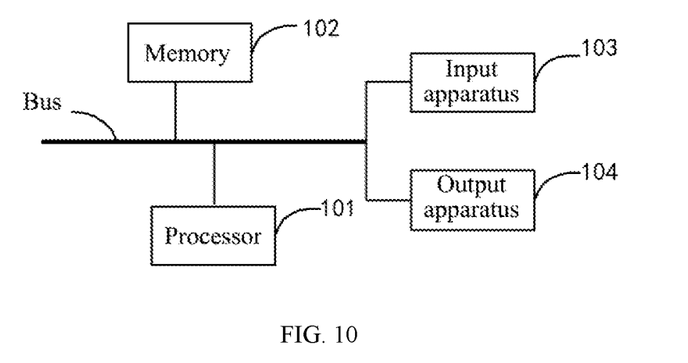
FIG. 10 is a schematic diagram according to a tenth embodiment of the present application.

FIG. 10 is a schematic diagram according to a tenth embodiment of the present application. As shown in FIG. 10, the electronic device provided in the present embodiment includes: one or more processors 101, a memory 102, and interfaces for connecting various components, including a high-speed interface and a low-speed interface. The various components are interconnected through different buses and can be installed on a common motherboard or be installed in other ways as required. The processor may process instructions executed within the electronic device, where the instructions include instructions stored in or on the memory to display graphical information of a Graphical User Interface (GUI) on an external input/output apparatus (such as, a display device coupled to an interface). In other implementations, a plurality of processors and/or a plurality of buses may be used with a plurality of memories, if required. Similarly, a plurality of electronic devices can be connected, each of which provides some of necessary operations (for example, serving as a server array, a set of blade servers, or a multiprocessor system). In FIG. 10, one processor 101 is taken as an example.

The memory 102 is a non-transitory computer-readable storage medium according to the present application. The memory stores instructions executable by at least one processor to cause the at least one processor to perform the control method of the applet provided in the present application. The non-transitory computer-readable storage medium of the present application stores computer instructions, where computer instructions are used to cause a computer to perform the control method of the applet provided in the present application.

The memory 102, as a non-transitory computer-readable storage medium, can be used to store a non-transitory software program, a non-transitory computer-executable program and modules, such as program instructions/modules corresponding to the control method of the applet in the embodiments of the present application. By running the non-transitory software program, instructions and modules stored in the memory 102, the processor 101 performs various functional applications and data processing of the sever, that is, realizes the control method of an applet in the above method embodiments.

The memory 102 may include a program storing area and a data storing area, where the program storing area may store an operating system and an application program required by at least one function; and the data storing area may store data created according to the use of the electronic device for performing the control method of the applet, and so on. In addition, the memory 102 may include a high-speed random-access memory, and may also include a non-transitory memory, such as at least one magnetic disk storage device, a flash memory device, or other non-transitory solid-state memory devices. In some embodiments, the memory 102 may optionally include memories provided remotely with respect to the processor 101, and these remote memories may be connected via a network to the electronic device for performing the control method of the applet. Examples of the above-mentioned network may include, but are not limited to, the Internet, an intranet, a local area network, a mobile communication network and a combination thereof.

The electronic device for the control method of the applet may further include: an input apparatus 103 and an output apparatus 104. The processor 101, the memory 102, the input apparatus 103 and the output apparatus 104 may be connected via a bus or other means, and an example of a connection via the bus is shown in FIG. 10.

The input apparatus 103 may receive inputted digital or character information, and generate key signal inputs related to a user setting and functional control of electronic device of the control method of an applet. The input apparatus, for example, is a touch screen, a keypad, a mouse, a trackpad, a touchpad, a pointer, one or more mouse buttons, a trackball, a joystick and other input apparatuses. The output apparatus 104 may include: a display device, an auxiliary lighting apparatus (e.g., an LED), a tactile feedback apparatus (e.g., a vibration motor) and the like. The display device may include, but is not limited to, a liquid crystal display (LCD), a light emitting diode (LED) display and a plasma display. In some implementations, the display device may be a touch screen.

Various embodiments of the systems and technologies described herein may be implemented in a digital electronic circuit system, an integrated circuit system, a specialized ASIC (application specific integrated circuit), computer hardware, firmware, software, and/or a combination thereof. These various embodiments may include: being implemented in one or more computer programs, where the one or more computer programs may be executed and/or interpreted on a programmable system including at least one programmable processor, where the programmable processor may be a specialized or general-purpose programmable processor, which may receive data and instructions from a storage system, at least one input apparatus and at least one output apparatus and send data and instructions to the storage system, the at least one input apparatus and the at least one output apparatus.

These computer programs (also referred to as programs, software, software applications, or codes) include machine instructions of a programmable processor and can be implemented by using a high-level procedure and/or object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, which includes a machine-readable medium that receives a machine instruction as a machine-readable signal. The term "machine-readable signal" refers to any signal used to provide a machine instruction and/or data to the programmable processor.

In order to provide interaction with a user, the systems and technologies described herein may be implemented on a computer, where the computer has: a display apparatus (e.g., a CRT (cathode ray tube) or LCD (liquid crystal display) monitor) for displaying information to the user; and a keyboard and a pointing apparatus (e.g., a mouse or a trackball), through which the user can provide inputs to the computer. Other types of apparatuses may also be used to provide interaction with the user; for example, the feedback provided to the user may be any form of sensing feedback (such as, visual feedback, auditory feedback, or tactile feedback); and the input from the user may be received in any form (including acoustic input, voice input, tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementations of the systems and technologies described herein) including a front-end component, or in a computing system including any combination of the back-end component, the middleware component, or the front-end component. The components of the system may be interconnected via digital data communication (e.g., a communication network) in any form or medium. Examples of the communication network include: a local area network (LAN), a block-chain-based service network (BSN), a wide area network (WAN) and Internet.

A computing system may include a client and a server. The client and the server are generally located far away from each other and usually interact with each other through a communication network. A relationship between the client and the server is generated by computer programs running on corresponding computers and having a client-server relationship between each other. The server can be a cloud server, also known as a cloud computing server or a cloud host. It is a host product in the cloud computing service system to solve the defects about the difficulties in management and weak business scalability in the traditional physical host and virtual private server (VPS) services.

It should be understood that steps can be reordered, added, or deleted by using the various forms of processes shown above. For example, the steps recited in the present application can be performed in parallel, in sequence or in different orders, as long as expected results of the technical solutions disclosed by the present application can be realized, and there is no limitation herein.

The above specific implementations do not limit the protection scope of the present application. It should be understood by those skilled in the art that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A control method of an applet, applied to a cloud server and comprising:
    parsing audio information sent by a terminal device to obtain attribute information of the applet run by the terminal device, wherein the audio information is used to instruct to open the applet, and the attribute information is related to a frame and a page of the applet;
    sending a request for acquiring page data to an applet server corresponding to the applet based on the attribute information; and
    receiving the page data fed back by the applet server, generating a target page corresponding to the applet according to the page data and the attribute information, and sending the target page to the terminal device.

2. The method according to claim 1, wherein the generating a target page corresponding to the applet according to the page data and the attribute information comprises:
    determining a pre-stored page frame of the applet according to the attribute information related to the frame of the applet; and
    filling the page data into the page frame to generate the target page.

3. The method according to claim 2, wherein the attribute information comprises an intent of a frame, an intent of a page, and slot information;
    the parsing audio information sent by the terminal device to obtain attribute information related to the page of the applet comprising:
    converting the audio information into text information; and
    performing semantic parsing on the text information to obtain the intent for determining the frame and the intent for determining the page corresponding to the applet, and the slot information for determining a slot corresponding to the intent of the page.

4. The method according to claim 3, wherein the intent of the frame comprises a uniform resource locator;
the determining a pre-stored page frame of the applet according to the attribute information related to the frame of the applet comprises:
determining location information of the page frame stored in the cloud server according to the uniform resource locator; and
calling the page frame from the cloud server according to the location information.

5. The method according to claim 3, wherein the cloud server stores registration information generated when at least one applet is registered in the cloud server, and the attribute information further comprises an identification of the applet; after performing semantic parsing on the text information to obtain the intent for determining the frame and the intent for determining the page corresponding to the applet, and the slot information for determining a slot corresponding to the intent of the page, the method further comprises:
matching the intent of the frame, the intent of the page, and the slot information with each registration information; and
determining the identification according to any one of registration information if the any one of the registration information comprises the intent of the frame, the intent of the page, and the slot information.

6. The method according to claim 5, wherein the determining the identification according to any one of the registration information comprises:
determining information of a server corresponding to the applet according to the any one of the registration information; and
acquiring the identification from the server corresponding to the applet according to the information of the server corresponding to the applet.

7. The method according to claim 5, wherein the page data is selected from global page data of the applet according to the slot information and the intent of the page, and the global page data is determined based on the identification.

8. A control method of an applet, applied to a terminal device and comprising:
receiving audio information input by a user, wherein the audio information is used to instruct to open the applet run by the terminal device;
sending the audio information to a cloud server, wherein the audio information is used to obtain attribute information of the applet related to a frame and a page of the applet, and the attribute information is used to acquire page data fed back by an applet server corresponding to the applet and corresponding to the applet, the page data is used to generate a target page corresponding to the applet corresponding to the applet; and
receiving and outputting the target page.

9. A control method of an applet, applied to an applet server corresponding to the applet run by a terminal device and comprising:
receiving a request sent by a cloud server for acquiring page data corresponding to the applet, wherein the request carries attribute information of the applet which is obtained by parsing audio information used to open the applet, and the attribute information is related to a frame and a page of the applet; and
feeding back the page data determined according to the attribute information to the cloud server, wherein the page data is used to generate a target page corresponding to the applet according to the attribute information.

10. A cloud server, comprising:
at least one processor; and
a memory communicatively connected with the at least one processor; wherein, the memory stores instructions executable by the at least one processor, and the instructions are executed by the at least one processor, to cause the at least one processor to perform the method according to claim 1.

11. The cloud server according to claim 10, wherein the generating module is configured to determine a pre-stored page frame of the applet according to the attribute information related to the frame of the applet, and fill the page data into the page frame to generate the target page.

12. The cloud server according to claim 11, wherein the attribute information comprises an intent of a frame, an intent of a page, and slot information;
the parsing module is configured to convert the audio information into text information, and perform semantic parsing on the text information to obtain the intent for determining the frame and the intent for determining the page corresponding to the applet, and the slot information for determining a slot corresponding to the intent of the page.

13. The cloud server according to claim 12, wherein the intent of the frame comprises a uniform resource locator;
the parsing module is configured to determine location information of the page frame stored in the cloud server according to the uniform resource locator, and call the page frame from the cloud server according to the location information.

14. The cloud server according to claim 12, wherein the cloud server stores registration information generated when at least one applet is registered in the cloud server, and the attribute information further comprises an identification of the applet;
the parsing module is configured to match the intent of the frame, the intent of the page, and the slot information with each registration information and determine the identification according to any one of the registration information if the any one of the registration information comprises the intent of the frame, the intent of the page, and the slot information.

15. The cloud server according to claim 14, wherein the parsing module is configured to determine information of a server corresponding to the applet according to the any one of the registration information; and acquire the identification from the server corresponding to the applet according to the information of the server corresponding to the applet.

16. The cloud server according to claim 14, wherein the page data is selected from global page data of the applet according to the slot information and the intent of the page, and the global page data is determined based on the identification.

17. A terminal device, comprising:
at least one processor; and
a memory communicatively connected with the at least one processor; wherein, the memory stores instructions executable by the at least one processor, and the instructions are executed by the at least one processor, to cause the at least one processor to perform the method according to claim 8.

18. An applet server, comprising:
at least one processor; and
a memory communicatively connected with the at least one processor; wherein, the memory stores instructions executable by the at least one processor, and the instructions are executed by the at least one processor, to cause the at least one processor to perform the method according to claim 9.

19. A non-transitory computer-readable storage medium storing thereon computer instructions, wherein the computer instructions are used to cause a computer to perform the method according to claim 1.

20. A non-transitory computer-readable storage medium storing thereon computer instructions, wherein the computer instructions are used to cause a computer to perform the method according to claim 8.

* * * * *